US011537376B2

(12) United States Patent
Haener et al.

(10) Patent No.: US 11,537,376 B2
(45) Date of Patent: Dec. 27, 2022

(54) AUTOMATIC QUANTUM PROGRAM OPTIMIZATION USING ADJOINT-VIA-CONJUGATION ANNOTATIONS

(71) Applicant: Microsoft Technology Licensing, LLC, Redmond, WA (US)

(72) Inventors: Thomas Haener, Bellevue, WA (US); Martin Roetteler, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 457 days.

(21) Appl. No.: 16/828,682

(22) Filed: Mar. 24, 2020

(65) Prior Publication Data
US 2021/0124567 A1    Apr. 29, 2021

Related U.S. Application Data

(60) Provisional application No. 62/925,585, filed on Oct. 24, 2019.

(51) Int. Cl.
*G06N 10/20* (2022.01)
*G06F 8/41* (2018.01)
*G06N 10/00* (2022.01)

(52) U.S. Cl.
CPC ............. *G06F 8/447* (2013.01); *G06N 10/00* (2019.01); *G06N 10/20* (2022.01)

(58) Field of Classification Search
CPC ......... G06F 8/447; G06N 10/00; G06N 10/20
See application file for complete search history.

(56) References Cited

U.S. PATENT DOCUMENTS

2021/0295194 A1*  9/2021  Low ................. G06F 17/16

OTHER PUBLICATIONS

Barenco et al., "Approximate quantum Fourier transform and decoherence," *Physical Review A*, vol. 54, No. 1, pp. 139-146 (Jul. 1996).
Barenco et al., "Elementary gates for quantum computation," *Physical Review A*, vol. 52, No. 5, pp. 3457-3467 (Nov. 1995).
(Continued)

*Primary Examiner* — Kurtis R Bahr
(74) *Attorney, Agent, or Firm* — Klarquist Sparkman, LLP

(57) ABSTRACT

None of the existing quantum programming languages provide specialized support for programming patterns such as conditional-adjoint or adjoint-via-conjugation. As a result, compilers of these languages fail to exploit the optimization opportunities mentioned in this disclosure. Further, none of the available quantum programming languages provide support for automatic translation of circuits using clean qubits to circuits that use idle qubits. Thus, the resulting circuits oftentimes use more qubits than would be required. Embodiments of the disclosed technology, thus allow one to run said circuits on smaller quantum devices. Previous multiplication circuits make use of (expensive) controlled additions. Embodiments of the disclosed technology employ multipliers that work using conditional-adjoint additions, which are cheaper to implement on both near-term and large-scale quantum hardware. The savings lie between 1.5 and 2× in circuit depth for large number of qubits.

20 Claims, 9 Drawing Sheets

(56) References Cited

OTHER PUBLICATIONS

Beauregard, "Circuit for Shor's algorithm using 2n+3 qubits," *Proc. Quantum Information & Computation*, vol. 3, No. 2, 14 pp. (Feb. 2003).

Bocharov et al., "Efficient Synthesis of Probabilistic Quantum Circuits with Fallback," *Physical Review A*, vol. 91, No. 5, 17 pp. (May 2015).

Bocharov et al., "Efficient Synthesis of Universal Repeat-Until-Success Circuits," *Physical Review Letters*, 15 pp. (Feb. 2015).

Cleve et al., "Fast parallel circuits for the quantum Fourier transform," *Proc. 41st Annual Symp. on Foundations of Computer Science*, pp. 526-536 (Nov. 2000).

Cuccaro et al., "A new quantum ripple-carry addition circuit," arXiv:quant-ph/0410184v1, 9 pp. (Oct. 2004).

Draper, "Addition on a Quantum Computer," *Quantum Physics*, 8 pp. (Aug. 2000).

Gidney, "Creating bigger controlled nots from single quit, Toffoli, and CNOT gates, without Workspace," downloaded from World Wide Web, 5 pp. (Sep. 2015).

Griffiths et al., "Semiclassical Fourier Transform for Quantum Computation," *Physical Review Letters*, Vo. 76, No. 17, 7 pp. (Apr. 1996).

Häner et al., "Factoring Using 2n+2 Qubits with Toffoli Based Modular Multiplication," *Journal of Quantum Information & Computation*, vol. 17, No. 7-8, pp. 673-684 (Jun. 2017).

Jones, "Novel constructions for the fault-tolerant Toffoli gate," *Physical Review A*, vol. 87, No. 2, 5 pp. (Feb. 2013).

Kliuchnikov et al., "Practical approximation of single-qubit unitaries by single-qubit quantum Clifford and T circuits," *IEEE Trans. on Computers*, vol. 65, No. 1, pp. 161-172 (Jan. 2016).

Kutin,"Shor's Algorithm on a Nearest-Neighbor Machine," arXiv:quant-ph/0609001v1, 11 pp. (Aug. 2006).

Ross et al., "Optimal ancilla-free clifford+T approximation of z-rotations," *Journal of Computing Research Repository*, vol. 16, No. 11-12 pp. 901-953 (Sep. 2016).

Selinger, "Efficient Clifford+T approximation of single-qubit operators," *Journal of Quantum Information & Computation*, vol. 15, No. 1-2, pp. 159-180 (Jan. 2015).

Shor, "Algorithms for Quantum Computation: Discrete Logarithms and Factoring," *Proc. Symp. on Foundations of Computer Science*, pp. 124-134 (Nov. 1994).

Smelyanskiy et al., "qHiPSTER: The Quantum High Performance Software Testing Environment," arXiv:1601.07195v2, pp. 1-9 (May 2016).

Takahashi et al., "A quantum circuit for Shor's factoring algorithm using 2n+2 qubits," *Quantum Information and Computation*, powerpoint presentation, vol. 6, No. 2, 16 pp. (2006).

Takahashi et al., "Quantum Addition Circuits and Unbounded Fan-Out," arXiv:090.2530v1, pp. 1-17 (Oct. 2009).

Van Meter et al., "Fast quantum modular exponentiation," *Physical Review A*, vol. 71, 12 pp. (May 2005).

Wecker et al., "LIQUi|>: A Software Design Architecture and Domain-Specific Language for Quantum Computing," arXiv:1402.4467v1, 14 pp. (Feb. 2014).

Bettelli et al., "Toward an architecture for quantum programming," Proceedings of the European Physical Journal D—Atomic, Molecular, Optical and Plasma Physics, vol. 25, Issue 2, pp. 181-200 (Aug. 1, 2003).

Haner et al., "A Software Methodology for Compiling Quantum Programs," Journal of Computing Research, retrieved from https://arxiv.org/pdf/1604.01401.pdf, 14 pages (May 11, 2016).

International Search Report and Written Opinion issued in PCT Application No. PCT/US2020/055297, dated Feb. 12, 2021, 12 pages.

Steiger, Damian S., "Software and Algorithms for Quantum Computing," Doctoral Thesis of Science of ETH Zurich, 124 pages (Jan. 1, 2018).

\* cited by examiner

AUTOMATIC QUANTUM PROGRAM OPTIMIZATION USING ADJOINT-VIA-CONJUGATION ANNOTATIONS

CROSS-REFERENCE TO RELATED APPLICATIONS

This application claims the benefit of U.S. Provisional Application No. 62/925,585 entitled "AUTOMATIC QUANTUM PROGRAM OPTIMIZATION USING ADJOINT-VIA-CONJUGATION ANNOTATIONS" filed on Oct. 24, 2019, which is hereby incorporated herein in its entirety.

FIELD

This application concerns quantum computing devices and their programming.

BACKGROUND

None of the existing quantum programming languages provide specialized support for programming patterns such as conditional-adjoint or adjoint-via-conjugation. As a result, compilers of these languages fail to exploit the optimization opportunities described in this disclosure. Further, none of the available quantum programming languages provide support for automatic translation of circuits using clean qubits to circuits that use idle qubits. Thus, the resulting circuits oftentimes use more qubits than are required.

Embodiments of the disclosed technology, allow one to run said circuits on smaller quantum devices. Previous multiplication circuits make use of (expensive) controlled additions. Embodiments of the disclosed technology employ multipliers that work using conditional-adjoint additions, which are cheaper to implement on both near-term and large-scale quantum hardware. In some examples, the savings lie between 1.5 and 2× in circuit depth for larger numbers of qubits.

SUMMARY

The disclosed methods, apparatus, and systems should not be construed as limiting in any way. Instead, the present disclosure is directed toward all novel and nonobvious features and aspects of the various disclosed embodiments, alone or in various combinations and subcombinations with one another. Furthermore, any features or aspects of the disclosed embodiments can be used in various combinations and subcombinations with one another. For example, one or more method acts from one embodiment can be used with one or more method acts from another embodiment and vice versa. The disclosed methods, apparatus, and systems are not limited to any specific aspect or feature or combination thereof, nor do the disclosed embodiments require that any one or more specific advantages be present or problems be solved.

In some embodiments, a high-level description of a quantum program to be implemented in a quantum-computing device is received; the high-level description of the quantum program can be compiled into a lower-level program that is executable by a quantum-computing device. In particular implementations, for example, one or more adjoint-via-conjugation annotations in the high-level description are recognized; and the lower-level program is generated so that the quantum-computing device uses one or more idle qubits in response to the one or more adjoint-via-conjugation annotations. In some implementations, one or more idle qubits replace a respective one or more qubits that are in a clean state, thereby reducing a total number of qubits required to implement the quantum program. In certain implementations, the method further comprises implementing the lower-level program in the quantum-computing device. In some implementations, the compiling comprises matching code fragments that correspond to conditional-adjoint statements; in some examples, the matching uses information given in the one or more adjoint-via-conjugation annotations. In certain implementations, the one or more idle qubits are in an unknown superposition state. In some implementations, the compiling comprises performing one or more replacements of one or more references to controlled operations in the high-level description of the quantum program with references to the one or more conditional-adjoint statements. In some examples, the performing of the one or more replacements is conditional on whether there are enough available qubits in the quantum-computing device when operated in accordance with the lower-level program. In certain examples, the lower-level program implements a reversible multiplier in the quantum-computing device using conditional-adjoint additions instead of regular controlled additions.

Any of the disclosed embodiments can be implemented by one or more computer-readable media storing computer-executable instructions, which when executed by a computer cause the computer to perform any of the disclosed methods.

The foregoing and other objects, features, and advantages of the disclosed technology will become more apparent from the following detailed description, which proceeds with reference to the accompanying figures.

DETAILED DESCRIPTION

I. General Considerations

Figure 1:
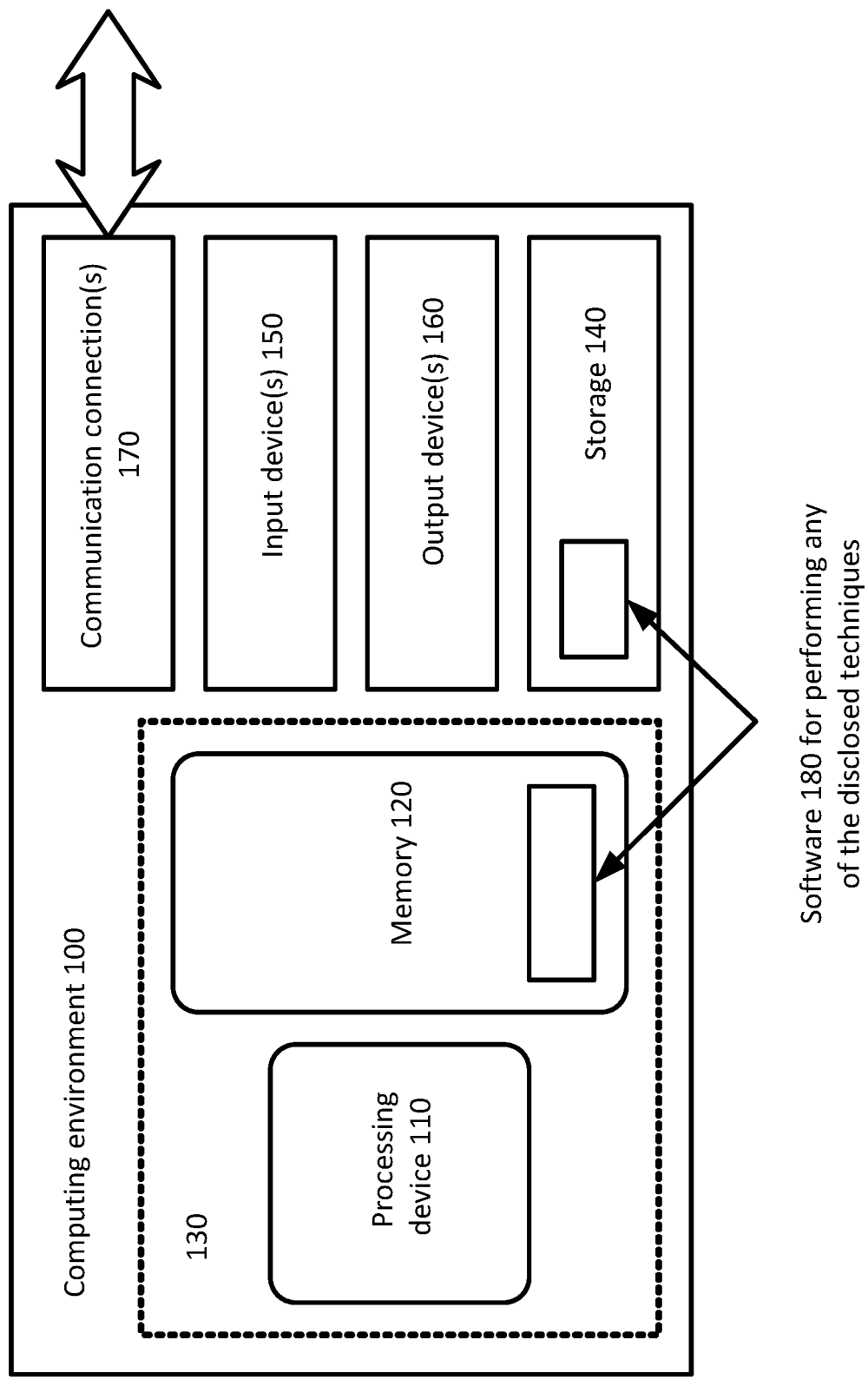
FIG. 1 illustrates a generalized example of a suitable classical computing environment in which aspects of the described embodiments can be implemented.

The disclosed methods, apparatus, and systems should not be construed as limiting in any way. Instead, the present disclosure is directed toward all novel and nonobvious features and aspects of the various disclosed embodiments, alone or in various combinations and subcombinations with one another. Furthermore, any features or aspects of the disclosed embodiments can be used in various combinations and subcombinations with one another. For example, one or more method acts from one embodiment can be used with one or more method acts from another embodiment and vice versa. The disclosed methods, apparatus, and systems are not limited to any specific aspect or feature or combination thereof, nor do the disclosed embodiments require that any one or more specific advantages be present or problems be solved.

Various alternatives to the examples described herein are possible. The various aspects of the disclosed technology can be used in combination or separately. Different embodiments use one or more of the described innovations. Some of the innovations described herein address one or more of the problems noted in the background. Typically, a given technique/tool does not solve all such problems.

As used in this application and in the claims, the singular forms "a," "an," and "the" include the plural forms unless the context clearly dictates otherwise. Additionally, the term "includes" means "comprises." Further, as used herein, the term "and/or" means any one item or combination of any items in the phrase.

II. Brief Overview

The disclosed technology involves replacing controlled operations by conditional-adjoint (or "conditionally inverted") operations. These can be implemented more cheaply if adjoint-via-conjugation information is available for the given operation. As discussed herein, an adjoint-via-conjugation operation is one way to invert certain quantum operations. In some embodiments of the disclosed technology, the adjoint-via-conjugation information (which describes how to invert using conjugation) can be added as annotations to quantum operations described by the programmer of a quantum program. Further, embodiments of the disclosed technology further apply a conditional-adjoint of an operation "U" when available. In an exemplary manner of expression this conditional operation is succinctly stated: "If the control_qubit is 1, apply the inverse of U, else apply U". The use of conditional-adjoint can use the adjoint-via-conjugation information in order to use fewer quantum-computing resources.

III. Detailed Embodiments of the Disclosed Technology

Some quantum programming languages support specialized, modifier-specific implementations of user-defined quantum operations, where the modifier turns the original quantum operation into its controlled, inverse, or controlled inverse. Thus, the programmer may provide optimized implementations that should be chosen by the compiler whenever (e.g., the user-defined quantum operation is executed conditionally on other qubits).

Such language support allows for various optimizations that previously had to be carried out manually. And while the four versions—regular, controlled, inverse, controlled-inverse—cover a wide range of cases, a fifth version is presented that allows reduction of circuit depth and width. Specifically, the "adjoint-via-conjugation" annotation is introduced, which expresses that the operation being annotated can be inverted by conjugating it with another quantum operation. Such annotations allow the compiler to implement conditional-adjoint operations more efficiently. Conditional-adjoint means that the given unitary operation is executed, or its inverse; the choice being conditional on one or several other quantum bits. In pseudo code:

```
If control_qubit:
    U(target);
Else:
    Inverse(U)(target);
```

Upon encountering such a code fragment, the compiler may check whether the operation U supports "adjoint via conjugation", which would allow it to rewrite the above as

```
If control_qubit:
    V(target);
U(target)
If control_qubit:
    Inverse(V)(target);
``` where V is the quantum operation that inverts U when U is conjugated with V (i.e., Inverse(U)=Inverse(V) U V). Oftentimes, V is much cheaper to implement than U which, in turn, also makes it cheaper to execute conditionally.

In addition to this optimization, this disclosure discloses how this annotation allows to automatically perform the following nontrivial optimizations, including one or more of: (1) reducing qubit requirements by automatically transforming an implementation using clean qubits to an implementation that may use qubits that are idle but not necessarily in a definite state (qubits that hold intermediate results); or (2) reducing the circuit depth for various applications by using conditional adjoints instead of controlled quantum operations.

In a previous work (Häner, et al., "Factoring using 2n+2 qubits with Toffoli based modular multiplication," https://arxiv.org/abs/1611.07995), it was shown how addition by a constant to a quantum number can be performed more efficiently using idle qubits. Here, it is shown how this can be generalized and brought into a form where "adjoint via conjugation" can be used to automatically arrive at an implementation that uses idle qubits.

Figure 7:
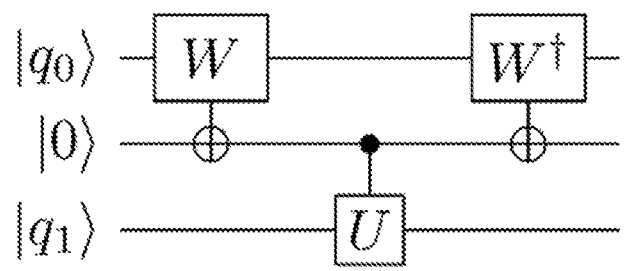
FIGS. 7-8 are schematic block diagrams illustrating example embodiments of the disclosed technology as quantum circuit diagrams.
Figure 8:
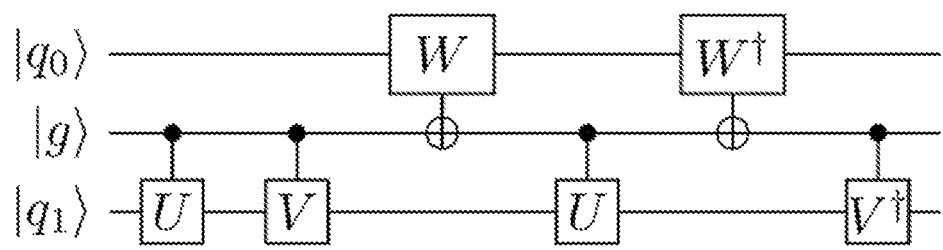

Specifically, the quantum circuit for executing the original circuit is illustrated in schematic block diagram 700 of FIG. 7. With an idle qubit, denoted by |g>, in its most general form appears as shown in schematic block diagram 800 of FIG. 8.

The first circuit executes U if and only if W flips the second qubit (initially 0). To see that the second circuit does the same, note that if W flips g, then either U, V, and Inverse(V) get executed, or just the middle U. Both cases simplify to just U. If, on the other hand, W does not flip g, then either no operations are executed on q1, or the entire sequence U, V, U, Inverse(V) is executed. Since Inverse(U) =Inverse(V) U V, the entire sequence amounts to performing no quantum operations whatsoever, as desired. Thus the two circuits are equivalent, but the latter uses an idle qubit.

Therefore, with the extra information of the "adjoint via conjugation" annotation, the compiler can automatically transform the first circuit into a circuit that uses idle qubits by repeatedly applying the rewrite step above.

It will now be detailed how the "adjoint via conjugation" annotation helps the compiler to reduce the depth of the resulting quantum circuit. By recognizing the code fragment stated in the introduction and replacing it directly with the optimized implementation, a reduction in circuit depth of more than 2× is possible: The circuit for U does not have to be applied twice (once regular, once inverted) and no control qubits are required for the U operation. Thus, if the controlled version of V can be cheaply executed, significant savings are possible via pattern matching.

Furthermore, several quantum subroutines can get away with the conditional-adjoint of U instead of the regular controlled version of U. In such cases, the above savings can be achieved even if there was no such conditional-adjoint pattern in the original code. Two examples are now given where such savings are possible.

As a first example, consider phase estimation. Standard phase estimation requires a controlled unitary U, of which it estimates the eigenphase(s) and prepares the corresponding eigenstate(s). This works using the effect of quantum interference, where the phase estimation qubit is initialized to a superposition, the unitary U is applied to the target quantum register only if the phase estimation qubit is in |1> and finally, the phase estimation qubit is measured in the X-basis. However, instead of requiring the mapping:

$$\frac{1}{\sqrt{2}}(|0\rangle + |1\rangle)|\psi\rangle \mapsto \frac{1}{\sqrt{2}}(|0\rangle|\psi\rangle + |1\rangle U|\psi\rangle)$$

The following mapping also works for the phase estimation procedure (see, e.g., Reiher et al., "Elucidating Reaction Mechanisms on Quantum Computers" haps://arxiv.org/pdf/16050.03590.pdf):

$$\frac{1}{\sqrt{2}}(|0\rangle + |1\rangle)|\psi\rangle \mapsto \frac{1}{\sqrt{2}}(|0\rangle U^\dagger|\psi\rangle + |1\rangle U|\psi\rangle)$$

Which is exactly the conditional adjoint: If the phase estimation qubit is 1, then apply U; else, apply the inverse of U, denoted by $U^\dagger$.

As a second example, consider multiplication. Many quantum applications require evaluation of classical functions on a superposition of inputs. These cannot be evaluated on a classical device as it would require reading out the quantum state, thus collapsing the superposition and destroying any quantum speedup. One example for this is multiplication which, in turn, can be used to build circuits that evaluate higher-level functions such as sin(x), exp(x), etc. via polynomial approximation.

The standard way to implement a multiplication of two n-bit numbers reversibly (and thus quantumly) is to have n controlled additions, where each addition is conditioned on one of the n input bits. While implementing a controlled version of an addition is expensive, the conditional-adjoint of an addition can be implemented using zero additional non-Clifford gates—no further expensive gates are required. Specifically, the addition can be inverted by placing Pauli-X operations before and after the addition. Thus, a conditional-adjoint can be performed by controlled these Pauli-X operations on the control qubit, turning them into CNOT gates.

To see that this construct can be used to build a multiplication circuit, note that the controlled addition can be rewritten in terms of a conditional-adjoint:

$$x + c \cdot y = x + \frac{y}{2} - \frac{(-1)^c y}{2}$$

where c denotes the control qubit (0 or 1) and x and y denote n-bit input numbers to be added. Therefore, the controlled addition can be performed using a conditional-adjoint addition of $$\frac{y}{2}$$

and a regular addition of $$\frac{y}{2}.$$

On its own, this is not useful as it does not help to reduce the cost. However, because the entire multiplication consists of n such controlled additions, one can collect all regular addition of $$\frac{y}{2}$$

and perform them in a single step by adding $$\frac{(2^n - 1)y}{2},$$

which is equivalent to first adding y, shifted by n−1 positions, and then subtracting y/2.

In summary, one can thus carry out the entire multiplication using n−1 conditional-adjoint additions, 1 regular addition of y shifted by n−1 positions, and 1 controlled addition which merges the first conditional-adjoint addition with the final correcting subtraction of $$\frac{y}{2}.$$

For large n, this allows for savings between 1.5 and 2×, depending on which (controlled) addition circuit is used.

Figure 5:
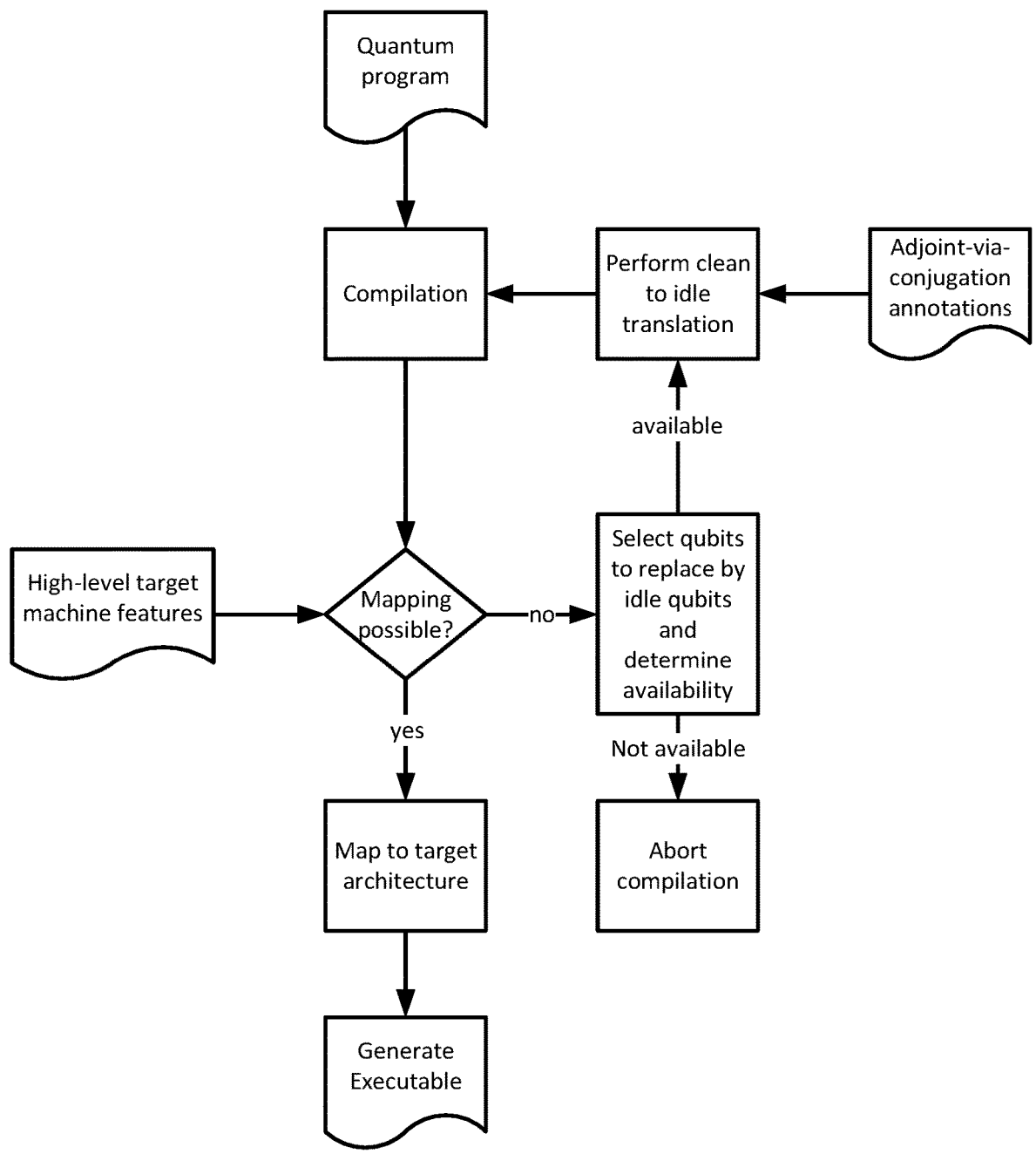
FIGS. 5-6 are flow charts for performing example embodiments of the disclosed technology.
Figure 6:
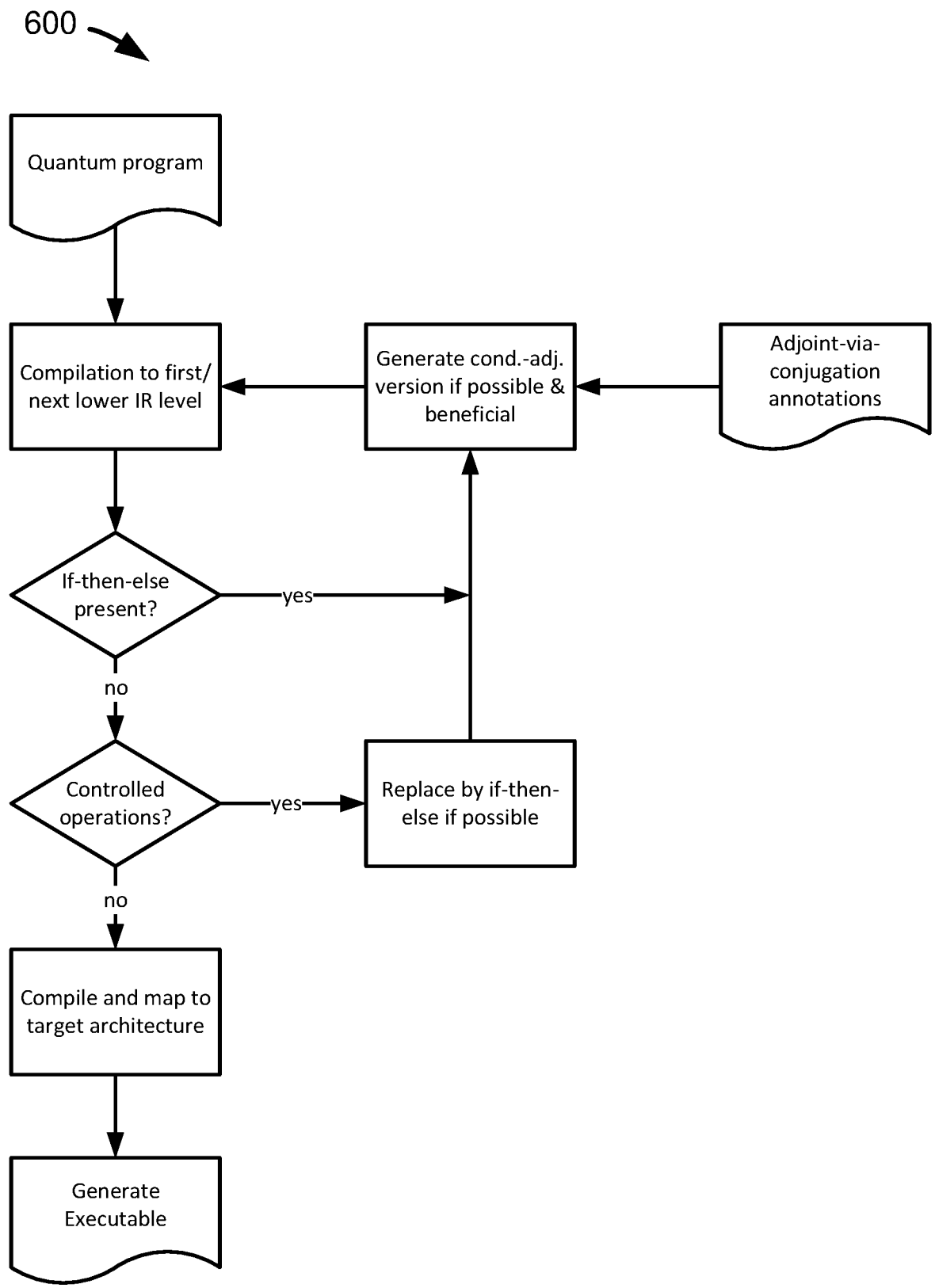

Further example embodiments are illustrated in FIGS. 5 and 6, which are flowchart 500 and 600, respectively, illustrating methods for using adjoint-via-conjugation annotations to achieve the described reductions in qubit usage. The particular operations and sequence of operations should not be construed as limiting, as they can be performed alone or in any combination, subcombination, and/or sequence with one another. Additionally, the illustrated operations can be performed together with one or more other operations.

Flowchart 500 of FIG. 5 shows a process for using adjoint-via-conjugation annotations that results in converting clean qubits in quantum circuits that use idle qubits in an unknown state. The process of FIG. 5 is conditional on the availability of qubits that can be maintained in such unknown states.

Flowchart 600 of FIG. 6 shows a process for using adjoint-via-conjugation annotations to replace one or more quantum if/else constructs by quantum-conditional "either apply-U else apply-inverse-of-U", which is the same as conditional-adjoint, since the adjoint of a unitary is its inverse. If the given if/else construct can be rewritten in this manner, then this is done using additional information about U which specifies how U can be inverted via conjugation. I.e., this additional information specifies V such that executing V, U, and inverse(V) is equivalent to just executing inverse(U).

If, in the original code, there are (quantum) controlled operations, then these can sometimes be replaced by (quantum) if-then-else constructs. The examples above with respect phase estimation and multiplication illustrate this process. The quantum if-then-else constructs can then be explained above. Once one or more of the rewrite opportunities have been handled, the program can be mapped to the target architecture for execution.

Figure 9:
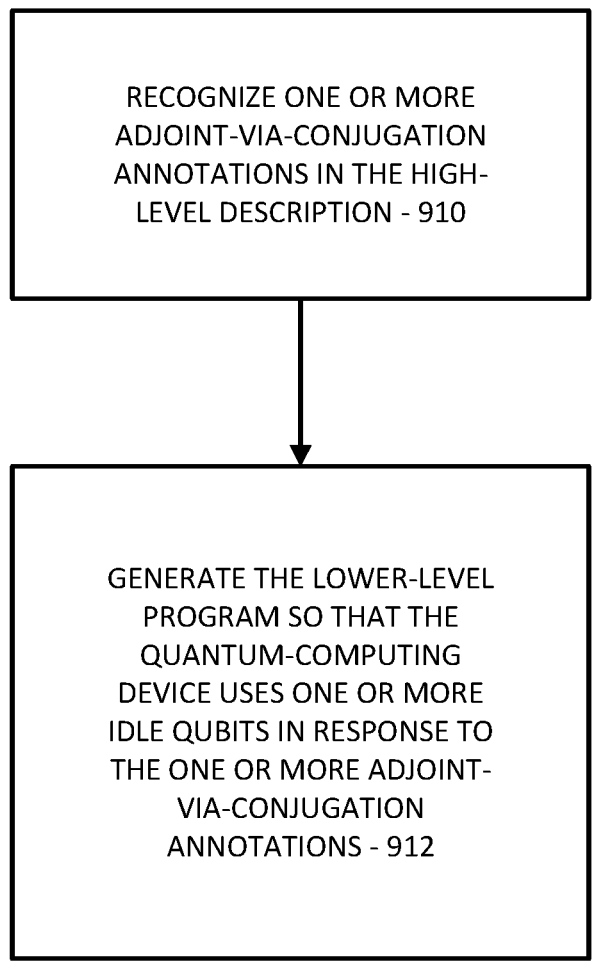
FIGS. 9-10 are flow charts for performing further example embodiments of the disclosed technology.

FIG. 9 is a flow chart 900 illustrating a method in accordance with the disclosed technology. The particular operations and sequence of operations should not be construed as limiting, as they can be performed alone or in any combination, subcombination, and/or sequence with one another. Additionally, the illustrated operations can be performed together with one or more other operations.

In some embodiments, the method is a computer-implemented method, comprising receiving a high-level description of a quantum program to be implemented in a quantum-computing device; and compiling the high-level description of the quantum program into a lower-level program that is executable by a quantum-computing device.

In particular embodiments, and at 910, one or more adjoint-via-conjugation annotations in the high-level description are recognized. At 912, the lower-level program is generated so that the quantum-computing device uses one or more idle qubits in response to the one or more adjoint-via-conjugation annotations.

In some implementations, one or more idle qubits replace a respective one or more qubits that are in a clean state, thereby reducing a total number of qubits required to implement the quantum program. In certain implementations, the method further comprises implementing the lower-level program in the quantum-computing device. In some implementations, the compiling comprises matching code fragments that correspond to conditional-adjoint statements; in some examples, the matching uses information given in the one or more adjoint-via-conjugation annotations. In certain implementations, the one or more idle qubits are in an unknown superposition state. In some implementations, the compiling comprises performing one or more replacements of one or more references to controlled operations in the high-level description of the quantum program with references to the one or more conditional-adjoint statements. In some examples, the performing of the one or more replacements is conditional on whether there are enough available qubits in the quantum-computing device when operated in accordance with the lower-level program. In certain examples, the lower-level program implements a reversible multiplier in the quantum-computing device using conditional-adjoint additions instead of regular controlled additions.

Figure 10:
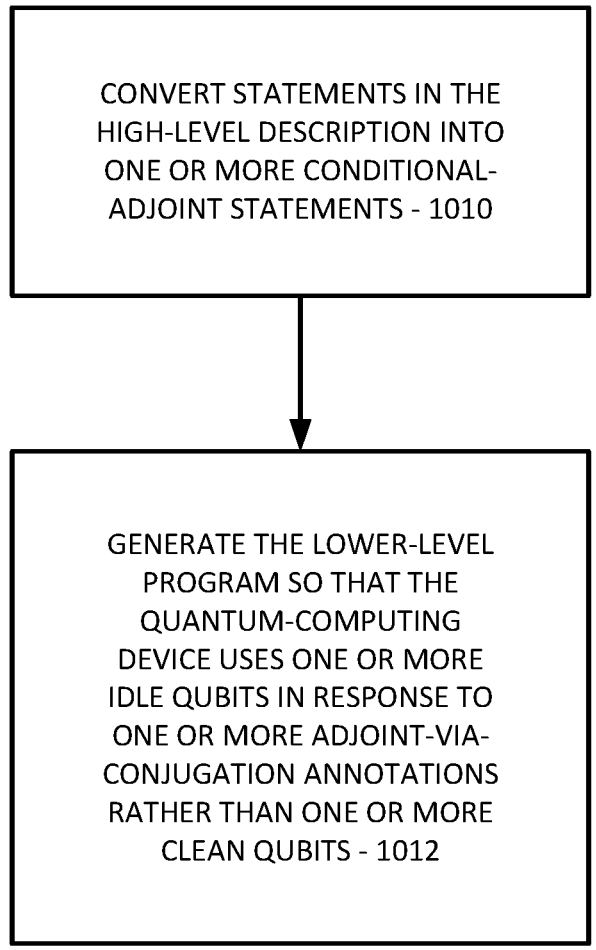

FIG. 10 is a flow chart 1000 illustrating another method in accordance with the disclosed technology. The particular operations and sequence of operations should not be construed as limiting, as they can be performed alone or in any combination, subcombination, and/or sequence with one another. Additionally, the illustrated operations can be performed together with one or more other operations.

In some embodiments, the method is a computer-implemented method, comprising receiving a high-level description of a quantum program to be implemented in a quantum-computing device; and compiling the high-level description of the quantum program into a lower-level program that is executable by a quantum-computing device.

As shown at 1010, the exemplary method comprises converting statements in the high-level description into one or more conditional-adjoint statements; and, at 1012, generating the lower-level program so that the quantum-computing device uses one or more idle qubits in response to one or more adjoint-via-conjugation annotations rather than one or more clean qubits.

In some implementations, the one or more idle qubits replace a respective one or more qubits that are in a clean state, thereby reducing a total number of qubits required to implement the quantum program. In further examples, the method comprises implementing the lower-level program in the quantum-computing device. In some examples, for instance, the compiling comprises matching code fragments that correspond to conditional-adjoint statements. The matching can use information given in the one or more adjoint-via-conjugation annotations. In some implementations, the one or more idle qubits are in an unknown superposition state. In certain implementations, the compiling comprises performing one or more replacements of one or more references to controlled operations in the high-level description of the quantum program with references to the one or more conditional-adjoint statements. In further embodiments, the performing of the one or more replacements is conditional on whether there are enough available qubits in the quantum-computing device when operated in accordance with the lower-level program.

IV. Example Computing Environments

FIG. 1 illustrates a generalized example of a suitable classical computing environment 100 in which aspects of the described embodiments can be implemented. The computing environment 100 is not intended to suggest any limitation as to the scope of use or functionality of the disclosed technology, as the techniques and tools described herein can be implemented in diverse general-purpose or special-purpose environments that have computing hardware.

With reference to FIG. 1, the computing environment 100 includes at least one processing device 110 and memory 120. In FIG. 1, this most basic configuration 130 is included within a dashed line. The processing device 110 (e.g., a CPU or microprocessor) executes computer-executable instructions. In a multi-processing system, multiple processing devices execute computer-executable instructions to increase processing power. The memory 120 may be volatile memory (e.g., registers, cache, RAM, DRAM, SRAM), non-volatile memory (e.g., ROM, EEPROM, flash memory), or some combination of the two. The memory 120 stores software 180 implementing tools for performing any of the disclosed techniques for operating a quantum computer as described herein. The memory 120 can also store software 180 for synthesizing, generating, or compiling quantum circuits for performing any of the disclosed techniques.

The computing environment can have additional features. For example, the computing environment 100 includes storage 140, one or more input devices 150, one or more output devices 160, and one or more communication connections 170. An interconnection mechanism (not shown), such as a bus, controller, or network, interconnects the components of the computing environment 100. Typically, operating system software (not shown) provides an operating environment for other software executing in the computing environment 100, and coordinates activities of the components of the computing environment 100.

The storage 140 can be removable or non-removable, and includes one or more magnetic disks (e.g., hard drives), solid state drives (e.g., flash drives), magnetic tapes or cassettes, CD-ROMs, DVDs, or any other tangible non-volatile storage medium which can be used to store information and which can be accessed within the computing environment 100. The storage 140 can also store instructions for the software 180 implementing any of the disclosed techniques. The storage 140 can also store instructions for the software 180 for generating and/or synthesizing any of the described techniques, systems, or quantum circuits.

The input device(s) 150 can be a touch input device such as a keyboard, touchscreen, mouse, pen, trackball, a voice input device, a scanning device, or another device that provides input to the computing environment 100. The output device(s) 160 can be a display device (e.g., a computer monitor, laptop display, smartphone display, tablet display, netbook display, or touchscreen), printer, speaker, or another device that provides output from the computing environment 100.

The communication connection(s) 170 enable communication over a communication medium to another computing entity. The communication medium conveys information such as computer-executable instructions or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

As noted, the various methods and techniques for performing any of the disclosed technologies, for controlling a quantum computing device, to perform circuit design or compilation/synthesis as disclosed herein can be described in the general context of computer-readable instructions stored on one or more computer-readable media. Computer-readable media are any available media (e.g., memory or storage device) that can be accessed within or by a computing environment. Computer-readable media include tangible computer-readable memory or storage devices, such as memory 120 and/or storage 140, and do not include propagating carrier waves or signals per se (tangible computer-readable memory or storage devices do not include propagating carrier waves or signals per se).

Various embodiments of the methods disclosed herein can also be described in the general context of computer-executable instructions (such as those included in program modules) being executed in a computing environment by a processor. Generally, program modules include routines, programs, libraries, objects, classes, components, data structures, and so on, that perform particular tasks or implement particular abstract data types. The functionality of the program modules may be combined or split between program modules as desired in various embodiments. Computer-executable instructions for program modules may be executed within a local or distributed computing environment.

Figure 2:
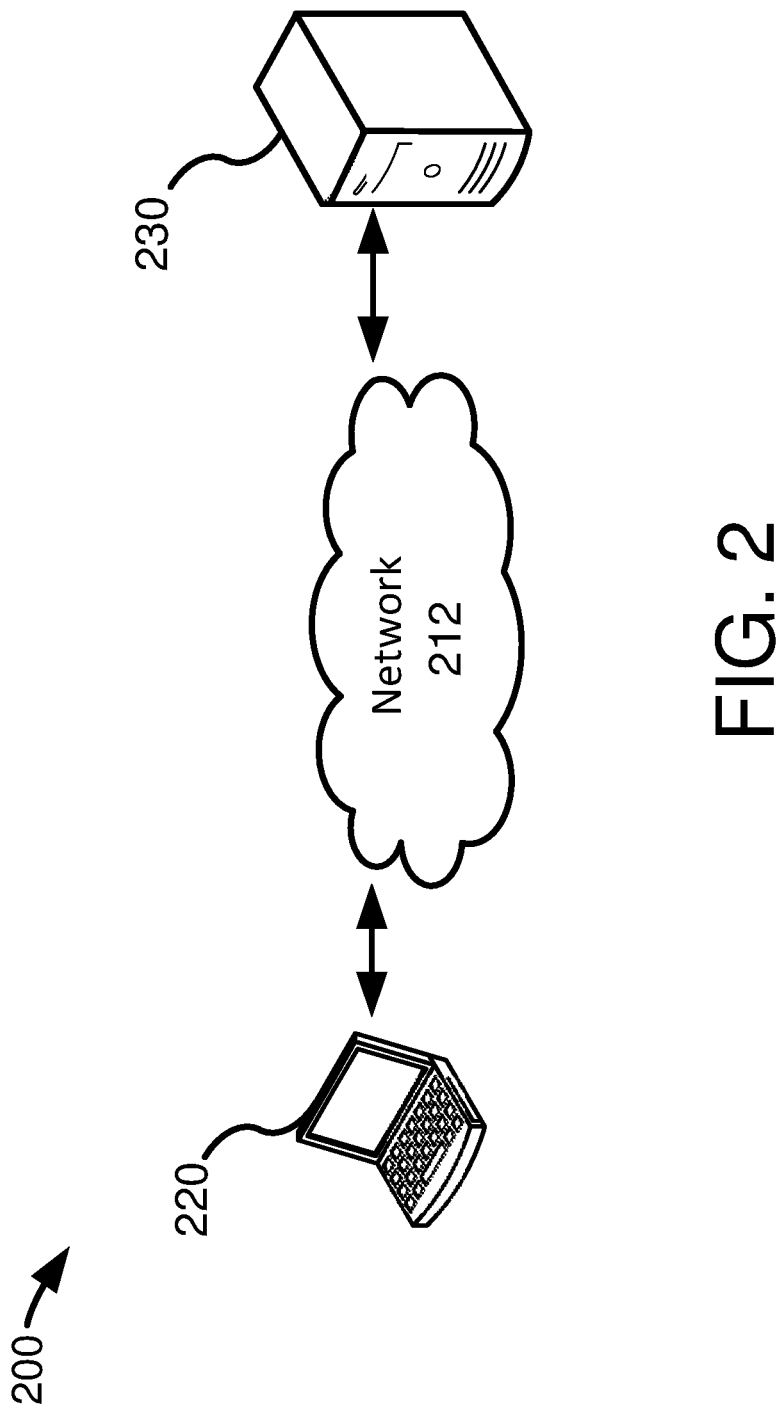
FIG. 2 illustrates an example of a possible network topology (e.g., a client-server network) for implementing a system according to the disclosed technology.

An example of a possible network topology 200 (e.g., a client-server network) for implementing a system according to the disclosed technology is depicted in FIG. 2. Networked computing device 220 can be, for example, a computer running a browser or other software connected to a network 212. The computing device 220 can have a computer architecture as shown in FIG. 1 and discussed above. The computing device 220 is not limited to a traditional personal computer but can comprise other computing hardware configured to connect to and communicate with a network 212 (e.g., smart phones, laptop computers, tablet computers, or other mobile computing devices, servers, network devices, dedicated devices, and the like). Further, the computing device 220 can comprise an FPGA or other programmable logic device. In the illustrated embodiment, the computing device 220 is configured to communicate with a computing device 230 (e.g., a remote server, such as a server in a cloud computing environment) via a network 212. In the illustrated embodiment, the computing device 220 is configured to transmit input data to the computing device 230, and the computing device 230 is configured to implement a technique for controlling a quantum computing device to perform any of the disclosed embodiments and/or a circuit generation/compilation/synthesis technique for generating quantum circuits for performing any of the techniques disclosed herein. The computing device 230 can output results to the computing device 220. Any of the data received from the computing device 230 can be stored or displayed on the computing device 220 (e.g., displayed as data on a graphical user interface or web page at the computing devices 220). In the illustrated embodiment, the illustrated network 212 can be implemented as a Local Area Network ("LAN") using wired networking (e.g., the Ethernet IEEE standard 802.3 or other appropriate standard) or wireless networking (e.g. one of the IEEE standards 802.11a, 802.11b, 802.11g, or 802.11n or other appropriate standard). Alternatively, at least part of the network 212 can be the Internet or a similar public network and operate using an appropriate protocol (e.g., the HTTP protocol).

Figure 3:
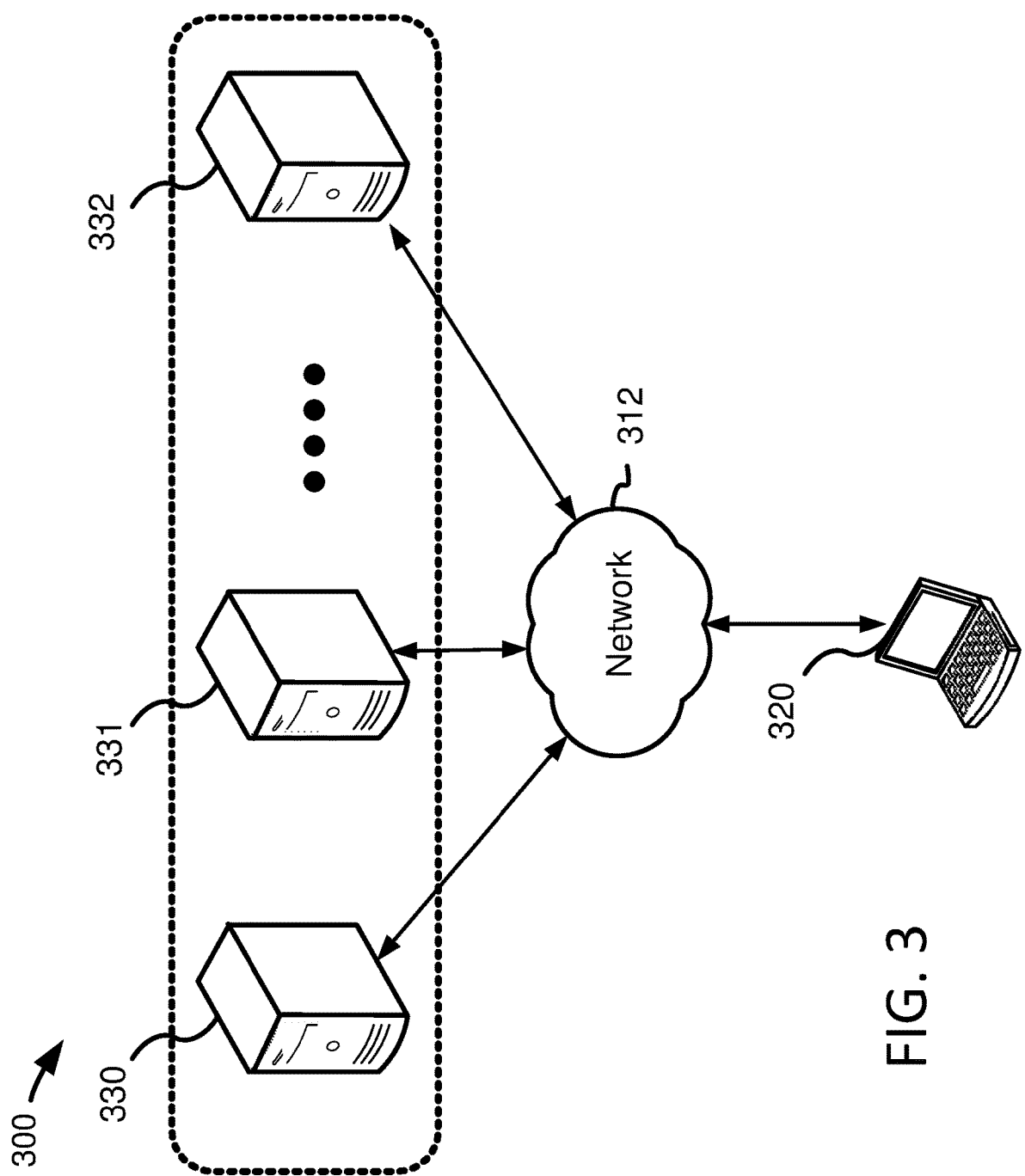
FIG. 3 illustrates another example of a possible network topology (e.g., a distributed computing environment) for implementing a system according to the disclosed technology.

Another example of a possible network topology 300 (e.g., a distributed computing environment) for implementing a system according to the disclosed technology is depicted in FIG. 3. Networked computing device 320 can be, for example, a computer running a browser or other software connected to a network 312. The computing device 320 can have a computer architecture as shown in FIG. 1 and discussed above. In the illustrated embodiment, the computing device 320 is configured to communicate with multiple computing devices 330, 331, 332 (e.g., remote servers or other distributed computing devices, such as one or more servers in a cloud computing environment) via the network 312. In the illustrated embodiment, each of the computing devices 330, 331, 332 in the computing environment 300 is used to perform at least a portion of the disclosed technology and/or at least a portion of the technique for controlling a quantum computing device to perform any of the disclosed embodiments and/or a circuit generation/compilation/synthesis technique for generating quantum circuits for performing any of the techniques disclosed herein. In other words, the computing devices 330, 331, 332 form a distributed computing environment in which aspects of the techniques for performing any of the techniques as disclosed herein and/or quantum circuit generation/compilation/synthesis processes are shared across multiple computing devices. The computing device 320 is configured to transmit input data to the computing devices 330, 331, 332, which are configured to distributively implement such as process, including performance of any of the disclosed methods or creation of any of the disclosed circuits, and to provide results to the computing device 320. Any of the data received from the computing devices 330, 331, 332 can be stored or displayed on the computing device 320 (e.g., displayed as data on a graphical user interface or web page at the computing devices 320). The illustrated network 312 can be any of the networks discussed above with respect to FIG. 2.

Figure 4:
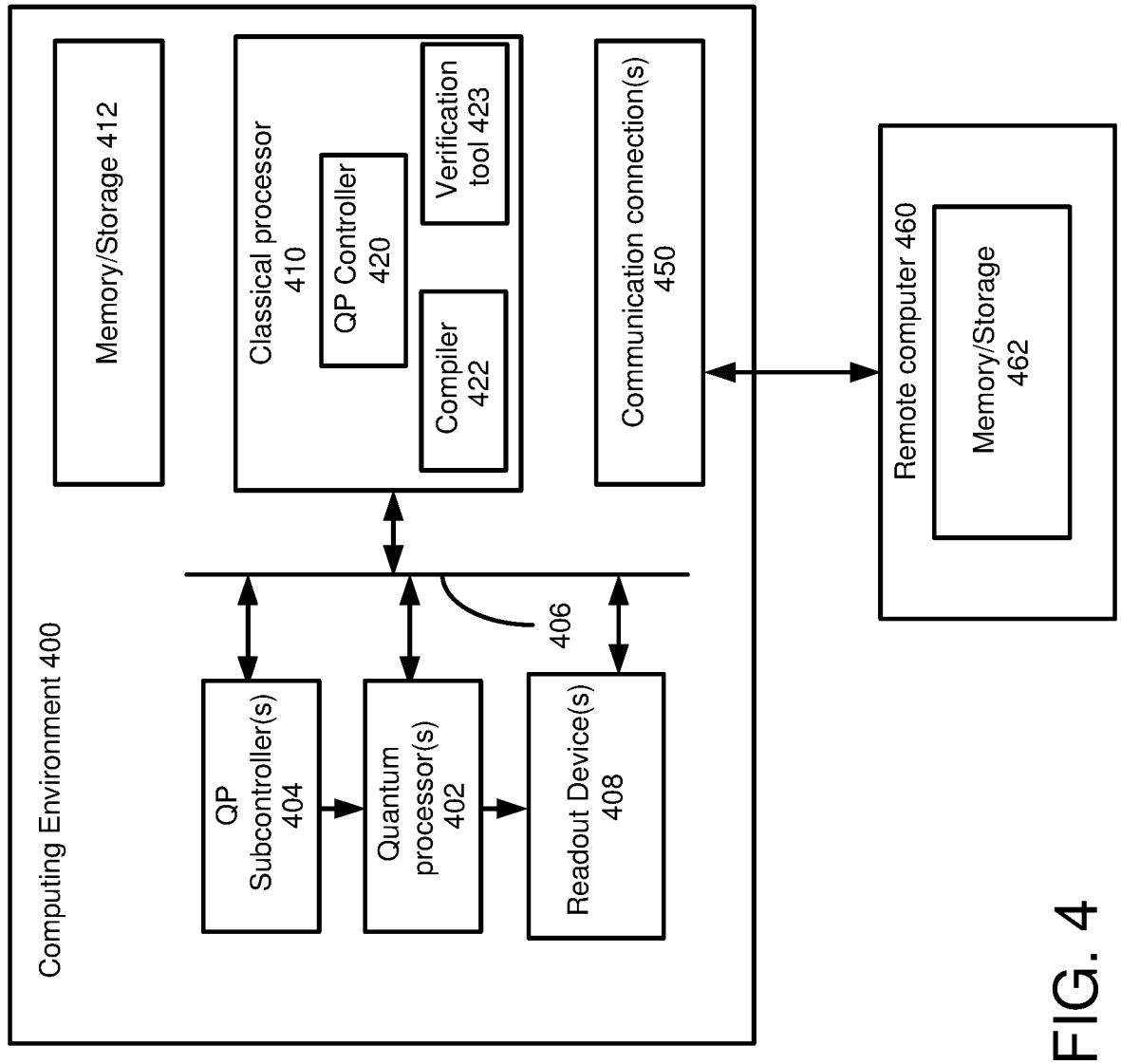
FIG. 4 illustrates an exemplary system for implementing the disclosed technology in which the system includes one or more classical computers in communication with a quantum computing device.

With reference to FIG. 4, an exemplary system for implementing the disclosed technology includes computing environment 400. In computing environment 400, a compiled quantum computer circuit description (including quantum circuits for performing any of the disclosed techniques as disclosed herein) can be used to program (or configure) one or more quantum processing units such that the quantum processing unit(s) implement the circuit described by the quantum computer circuit description.

The environment 400 includes one or more quantum processing units 402 and one or more readout device(s) 408. The quantum processing unit(s) execute quantum circuits that are precompiled and described by the quantum computer circuit description. The quantum processing unit(s) can be one or more of, but are not limited to: (a) a superconducting quantum computer; (b) an ion trap quantum computer; (c) a fault-tolerant architecture for quantum computing; and/or (d) a topological quantum architecture (e.g., a topological quantum computing device using Majorana zero modes). The precompiled quantum circuits, including any of the disclosed circuits, can be sent into (or otherwise applied to) the quantum processing unit(s) via control lines 406 at the control of quantum processor controller 420. The quantum processor controller (QP controller) 420 can operate in conjunction with a classical processor 410 (e.g., having an architecture as described above with respect to FIG. 1) to implement the desired quantum computing process. In the illustrated example, the QP controller 420 further implements the desired quantum computing process via one or more QP subcontrollers 404 that are specially adapted to control a corresponding one of the quantum processor(s) 402. For instance, in one example, the quantum controller 420 facilitates implementation of the compiled quantum circuit by sending instructions to one or more memories (e.g., lower-temperature memories), which then pass the instructions to low-temperature control unit(s) (e.g., QP subcontroller(s) 404) that transmit, for instance, pulse sequences representing the gates to the quantum processing unit(s) 402 for implementation. In other examples, the QP controller(s) 420 and QP subcontroller(s) 404 operate to provide appropriate magnetic fields, encoded operations, or other such control signals to the quantum processor(s) to implement the operations of the compiled quantum computer circuit description. The quantum controller(s) can further interact with readout devices 408 to help control and implement the desired quantum computing process (e.g., by reading or measuring out data results from the quantum processing units once available, etc.)

With reference to FIG. 4, compilation is the process of translating a high-level description of a quantum algorithm into a quantum computer circuit description comprising a sequence of quantum operations or gates, which can include the circuits as disclosed herein (e.g., the circuits configured to perform one or more of the procedures as disclosed herein). The compilation can be performed by a compiler 422 using a classical processor 410 (e.g., as shown in FIG. 4) of the environment 400 which loads the high-level description from memory or storage devices 412 and stores the resulting quantum computer circuit description in the memory or storage devices 412.

In other embodiments, compilation and/or verification can be performed remotely by a remote computer 460 (e.g., a computer having a computing environment as described above with respect to FIG. 1) which stores the resulting quantum computer circuit description in one or more memory or storage devices 462 and transmits the quantum computer circuit description to the computing environment 400 for implementation in the quantum processing unit(s) 402. Still further, the remote computer 400 can store the high-level description in the memory or storage devices 462 and transmit the high-level description to the computing environment 400 for compilation and use with the quantum processor(s). In any of these scenarios, results from the computation performed by the quantum processor(s) can be communicated to the remote computer after and/or during the computation process. Still further, the remote computer can communicate with the QP controller(s) 420 such that the quantum computing process (including any compilation, verification, and QP control procedures) can be remotely controlled by the remote computer 460. In general, the remote computer 460 communicates with the QP controller(s) 420, compiler/synthesizer 422, and/or verification tool 423 via communication connections 450.

In particular embodiments, the environment 400 can be a cloud computing environment, which provides the quantum processing resources of the environment 400 to one or more remote computers (such as remote computer 460) over a suitable network (which can include the internet).

V. Concluding Remarks

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed technology may be applied, it should be recognized that the illustrated embodiments are examples of the disclosed technology and should not be taken as a limitation on the scope of the disclosed technology.

What is claimed is:

1. A computer-implemented method, comprising:
   receiving a high-level description of a quantum program to be implemented in a quantum-computing device; and
   compiling the high-level description of the quantum program into a lower-level program that is executable by a quantum-computing device,
   wherein the compiling includes:
      recognizing one or more adjoint-via-conjugation annotations in the high-level description; and
      generating the lower-level program so that the quantum-computing device uses one or more idle qubits in response to the one or more adjoint-via-conjugation annotations.

2. The method of claim 1, wherein the one or more idle qubits replace a respective one or more qubits that are in a clean state, thereby reducing a total number of qubits required to implement the quantum program.

3. The method of claim 1, further comprising implementing the lower-level program in the quantum-computing device.

4. The method of claim 1, wherein the compiling comprises matching code fragments that correspond to conditional-adjoint statements.

5. The method of claim 4, wherein the matching uses information given in the one or more adjoint-via-conjugation annotations.

6. The method of claim 1, wherein the one or more idle qubits are in an unknown superposition state.

7. The method of claim 1, wherein the compiling comprises performing one or more replacements of one or more references to controlled operations in the high-level description of the quantum program with references to the one or more conditional-adjoint statements.

8. The method of claim 7, wherein the performing of the one or more replacements is conditional on whether there are enough available qubits in the quantum-computing device when operated in accordance with the lower-level program.

9. The method of claim 1, wherein the lower-level program implements a reversible multiplier in the quantum-computing device using conditional-adjoint additions instead of regular controlled additions.

10. A computer-implemented method, comprising:
receiving a high-level description of a quantum program to be implemented in a quantum-computing device; and
compiling the high-level description of the quantum program into a lower-level program that is executable by a quantum-computing device,
wherein the compiling includes:
converting statements in the high-level description into one or more conditional-adjoint statements; and
generating the lower-level program so that the quantum-computing device uses one or more idle qubits in response to one or more adjoint-via-conjugation annotations rather than one or more clean qubits.

11. The method of claim 10, wherein the one or more idle qubits replace a respective one or more qubits that are in a clean state, thereby reducing a total number of qubits required to implement the quantum program.

12. The method of claim 10, further comprising implementing the lower-level program in the quantum-computing device.

13. The method of claim 10, wherein the compiling comprises matching code fragments that correspond to conditional-adjoint statements.

14. The method of claim 13, wherein the matching uses information given in the one or more adjoint-via-conjugation annotations.

15. The method of claim 10, wherein the one or more idle qubits are in an unknown superposition state.

16. The method of claim 10, wherein the compiling comprises performing one or more replacements of one or more references to controlled operations in the high-level description of the quantum program with references to the one or more conditional-adjoint statements.

17. The method of claim 16, wherein the performing of the one or more replacements is conditional on whether there are enough available qubits in the quantum-computing device when operated in accordance with the lower-level program.

18. A system, comprising:
a quantum computing device; and
a classical computing device in communication with the quantum computing device,
the classical computing device being programmed to perform a method comprising:
compiling the high-level description of the quantum program into a lower-level program that is executable by a quantum-computing device, wherein the compiling includes:
recognizing one or more adjoint-via-conjugation annotations in the high-level description; and
generating the lower-level program so that the quantum-computing device uses one or more idle qubits in response to the one or more adjoint-via-conjugation annotations.

19. The system of claim 18, wherein the one or more idle qubits replace a respective one or more qubits that are in a clean state, thereby reducing a total number of qubits required to implement the quantum program.

20. The system of claim 18, wherein the compiling comprises matching code fragments that correspond to conditional-adjoint statements.

* * * * *